US012679334B2

(12) United States Patent
Carruthers et al.

(10) Patent No.: US 12,679,334 B2
(45) Date of Patent: Jul. 14, 2026

(54) VEHICLE MANAGEMENT FOR A PREDETERMINED EVENT

(71) Applicant: Cummins Inc., Columbus, IN (US)

(72) Inventors: Max Donald Carruthers, Yarm (GB); Stephen James McLaren, Middleton One Row (GB); Abdul Ishaq, Columbus, IN (US); Tarkan Yapici, Richmond (GB); Mehfoos Yacoob, Columbus, IN (US); Thomas Stewart, Darlington (GB); Jithin Benjamin, Columbus, IN (US); J. Steven Kolhouse, Columbus, IN (US); Kenneth M. Follen, Greenwood, IN (US); Ethan Charles Seifer, Hope, IN (US); Hoseinali Borhan, Bloomington, IN (US); Lisa A. Orth-Farrell, Columbus, IN (US); Joseph P. Chandraraj, Austin, TX (US); Michael Stuglik, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/381,822

(22) Filed: Oct. 19, 2023

(65) Prior Publication Data

US 2024/0132051 A1     Apr. 25, 2024
US 2024/0227778 A9     Jul. 11, 2024

Related U.S. Application Data

(60) Provisional application No. 63/418,409, filed on Oct. 21, 2022, provisional application No. 63/418,424, filed on Oct. 21, 2022.

(51) Int. Cl.
*B60W 20/50*     (2016.01)
*B60W 20/14*     (2016.01)
(Continued)

(52) U.S. Cl.
CPC ............ *B60W 20/50* (2013.01); *B60W 20/14* (2016.01); *B60W 30/146* (2013.01); (Continued)

(58) Field of Classification Search
CPC .... B60W 20/50; B60W 20/14; B60W 30/146; B60W 50/0205; B60W 50/0225; B60W 2050/0062; B60W 2510/246
See application file for complete search history.

(56) References Cited

U.S. PATENT DOCUMENTS

| | | | |
|---|---|---|---|
| 8,381,658 B1 * | 2/2013 | Miller | B61C 7/04 |
| | | | 105/26.05 |
| 9,030,170 B2 | 5/2015 | Thiamtong | |

(Continued)

FOREIGN PATENT DOCUMENTS

| | | | |
|---|---|---|---|
| CN | 113903960 A | * | 1/2022 |
| EP | 3875300 A1 | | 9/2021 |
| WO | 2021162785 A1 | | 8/2021 |

OTHER PUBLICATIONS

European Search Report for EP Patent Application No. 23204049, Issued on Mar. 14, 2024, 16 pages.

*Primary Examiner* — Wade Miles
*Assistant Examiner* — Jerrod Irvin Davis
(74) *Attorney, Agent, or Firm* — Faegre Drinker Biddle & Reath LLP

(57) ABSTRACT

In some implementations, a method may include obtaining target fault data indicating a preselected fault for a vehicle having a hydrogen source. In addition, the method may include obtaining vehicle fault data indicating a fault of the vehicle. The method may include identifying a match between the fault and the preselected fault. Moreover, the method may include purging, in response to the identifying the match, hydrogen from the hydrogen source so as to (Continued)

400

Obtain target fault data
405

Obtain vehicle fault data
410

Fault data match?
415

NO

YES

Initiate hydrogen purge
420

END reduce consequences of a battery thermal event by reducing the likelihood of a hydrogen-fueled fire.

21 Claims, 5 Drawing Sheets

(51) Int. Cl.
    *B60W 30/14*     (2006.01)
    *B60W 50/00*     (2006.01)
    *B60W 50/02*     (2012.01)

(52) U.S. Cl.
    CPC .... *B60W 50/0205* (2013.01); *B60W 50/0225* (2013.01); *B60W 2050/0062* (2013.01); *B60W 2510/246* (2013.01); *B60W 2556/00* (2020.02)

(56) References Cited

U.S. PATENT DOCUMENTS

| | | | |
|---|---|---|---|
| 9,093,726 B2 | 7/2015 | Prilutsky | |
| 9,586,574 B2 | 3/2017 | Nissato | |
| 9,954,259 B1 | 4/2018 | Grace et al. | |
| 10,658,714 B2 | 5/2020 | Grace et al. | |
| 10,755,492 B2 | 8/2020 | Light-Holets | |
| 2008/0044691 A1* | 2/2008 | Wake | H01M 8/04462 |
| | | | 429/513 |
| 2008/0183348 A1 | 7/2008 | Arita et al. | |
| 2015/0333379 A1 | 11/2015 | Janarthanam et al. | |
| 2016/0172696 A1 | 6/2016 | Milacic et al. | |
| 2016/0368479 A1 | 12/2016 | Kim et al. | |
| 2021/0129620 A1 | 5/2021 | Mazaira et al. | |
| 2021/0218077 A1 | 7/2021 | Janarthanam et al. | |
| 2023/0194054 A1* | 6/2023 | Maitre | F17C 13/123 |
| | | | 137/1 |

* cited by examiner

VEHICLE MANAGEMENT FOR A PREDETERMINED EVENT

CROSS-REFERENCE TO RELATED PATENT APPLICATIONS

This application claims priority to U.S. Provisional Application No. 63/418,424, filed Oct. 21, 2022 and U.S. Provisional Application No. 63/418,409, filed Oct. 21, 2022, the contents of both of which are herein incorporated by reference in their entirety.

FIELD

The present disclosure relates to managing a vehicle, and more specifically, to managing a vehicle with respect to a predetermined event.

BACKGROUND

A vehicle battery can increase in temperature during normal, intended operation or as the result of a malfunction. Methods can be implemented to manage the vehicle battery temperature.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include obtaining target fault data indicating a preselected fault for a vehicle having a hydrogen source. Method may also include obtaining vehicle fault data indicating a fault of the vehicle. Method may furthermore include identifying a match between the fault and the preselected fault. Method may in addition include purging, in response to the identifying the match, hydrogen from one or more components of the vehicle so as to reduce consequences of a battery thermal event by reducing the likelihood of a hydrogen-fueled fire. Other embodiments of this aspect include corresponding computer systems, apparatus, and computer programs recorded on one or more computer storage devices, each configured to perform the actions of the methods.

Implementations may include one or more of the following features. Method where both the fault and the preselected fault indicate an electrical short in the vehicle. Method where both the fault and the preselected fault indicate a fire on a component of the vehicle. Method where the component may include a battery of the vehicle or a fuel cell of the vehicle. Method where both the fault and the preselected fault indicate a collision of the vehicle. Method where both the fault and the preselected fault indicate a hydrogen leak in the vehicle. Implementations of the described techniques may include hardware, a method or process, or a computer tangible medium.

In one general aspect, vehicle may include a powertrain having a prime mover for propelling the vehicle, a hydrogen source for fueling the prime mover, a battery for supplying electricity to the vehicle, and a thermal management subsystem configured to: obtain vehicle status data for the vehicle, the vehicle status data including battery temperature data indicating a battery temperature of the battery; obtain modification criteria for the vehicle, the modification criteria having data corresponding to: a set of threshold temperatures associated with the battery, and a set of modifications associated with the vehicle; receiving an indication that the battery temperature exceeds a threshold temperature of the set of threshold temperatures; and initiate, in response to receiving an indication that the battery temperature exceeds the threshold temperature, one or more modifications of the set of modifications to the vehicle, the one or more modifications including purging stored hydrogen fuel from the hydrogen source of the vehicle so as to proactively vent hydrogen from the hydrogen fuel source in view of a predetermined event. Other embodiments of this aspect include corresponding computer systems, apparatus, and computer programs recorded on one or more computer storage devices, each configured to perform the actions of the methods.

Implementations may include one or more of the following features. Vehicle where the set of threshold temperatures may include: a first temperature; a second temperature greater than the first temperature; and a third temperature greater than the second temperature. Vehicle where the vehicle includes regenerative brakes, and where the threshold temperature is the first temperature, and where the one or more modifications may include: increasing cooling of the battery and disabling a regenerative braking function of the vehicle. Vehicle where the first temperature corresponds to a temperature prior to which contacts of the battery would otherwise be disconnected. Vehicle where the threshold temperature is the second temperature, and where the one or more modifications may include limiting a speed of the vehicle. Vehicle where the second temperature corresponds to a temperature at which limiting the speed of the vehicle will assist in cooling the battery. Vehicle where the threshold temperature is the third temperature, and where the one or more modifications may include purging stored hydrogen fuel from the hydrogen source of the vehicle until the vehicle until the hydrogen source is depleted. Vehicle where the third temperature corresponds to a temperature prior to which the vehicle would otherwise be deactivated. Vehicle where the thermal management system initiates the one or more modifications by selecting, based on the vehicle status data and the modification criteria, the one or more modifications from the set of modifications or where the thermal management system includes a hydrogen storage controller configured to actuate one or more valves to release hydrogen from the hydrogen source, and one or more valves includes a commanded pressure relief device. Implementations of the described techniques may include hardware, a method or process, or a computer tangible medium.

In one general aspect, controller may include a processor. Controller may also include a memory in communication with the processor, the memory containing program instructions that, when executed by the processor, are configured to cause the processor to perform a method, the method having: obtaining vehicle status data for a vehicle having a battery, the vehicle status data including battery temperature data indicating a battery temperature of the battery; obtaining modification criteria for the vehicle, the modification criteria having data corresponding to: a set of threshold temperatures associated with the battery, and a set of modifications associated with the vehicle; determining that the battery temperature exceeds a threshold temperature of the set of threshold temperatures; and initiating, in response to the determining that the battery temperature exceeds the threshold temperature, one or more modifications of the set of modifications to the vehicle, the one or more modifications including purging stored hydrogen fuel from a hydrogen source of the vehicle so as to proactively vent hydrogen from the hydrogen fuel source in view of a predetermined event. Other embodiments of this aspect include corresponding computer systems, apparatus, and computer programs recorded on one or more computer storage devices, each configured to perform the actions of the methods.

Implementations may include one or more of the following features. Controller where the set of threshold temperatures may include: a first temperature; a second temperature greater than the first temperature; and a third temperature greater than the second temperature. Controller where the threshold temperature is the first temperature, and where the one or more modifications may include: increasing cooling of the battery and disabling a regenerative braking function of the vehicle; and where the first temperature corresponds to a temperature prior to which contacts of the battery would otherwise be disconnected. Controller where the threshold temperature is the second temperature, and where the one or more modifications may include limiting a speed of the vehicle; and where the second temperature corresponds to a temperature at which limiting the speed of the vehicle will assist in cooling the battery. Controller where the threshold temperature is the third temperature, and where the one or more modifications may include deactivating the vehicle; and where the third temperature corresponds to a temperature prior to which the vehicle would otherwise be deactivated. Implementations of the described techniques may include hardware, a method or process, or a computer tangible medium.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
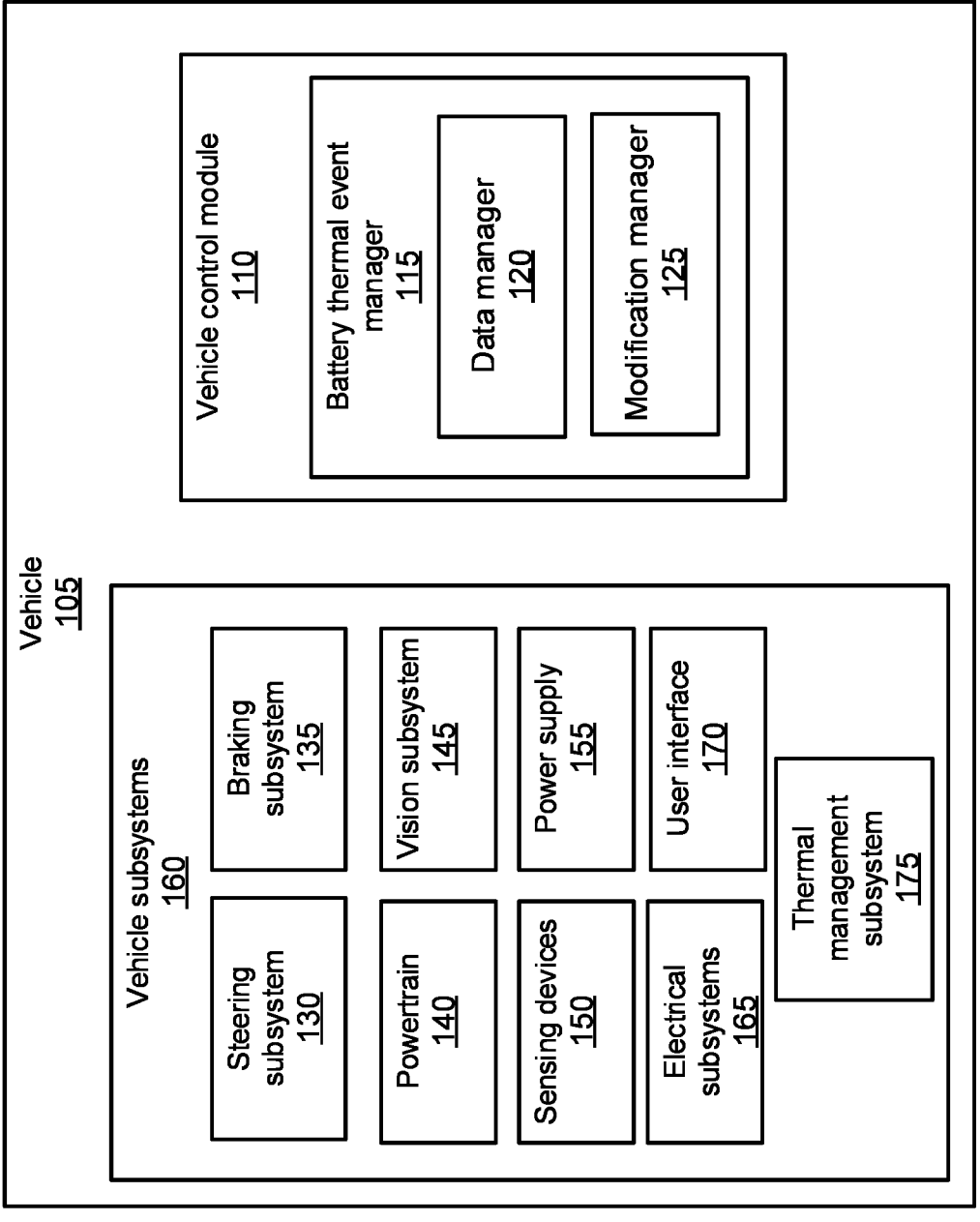
FIG. 1 depicts an example vehicle having a battery thermal event manager, in accordance with embodiments of the present disclosure.

While the disclosed subject matter is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The present disclosure relates to managing a vehicle; more particular aspects relate to managing a vehicle with respect to a predetermined event.

A vehicle, such as a battery electric vehicle, a combustion engine hybrid vehicle, a fuel cell electric vehicle, or the like, includes a power supply for providing electrical power to a powertrain of the vehicle to drive/propel the vehicle. Such a power supply can include a vehicle battery whose temperature can increase during usage. In certain instances, the temperature of the vehicle battery can increase to an extent that an active battery thermal event (e.g., an active vehicle battery fire) occurs.

To address these and other challenges, embodiments of the present disclosure include a battery thermal event manager. In some embodiments, the battery thermal event manager can initiate one or more modifications to a vehicle to prevent a potential battery thermal event. In some embodiments, the battery thermal event manager can initiate one or more modifications to a vehicle to mitigate damage from an active battery thermal event. More specifically, the battery thermal event manager can monitor a temperature of a vehicle battery and initiate one or more modifications to the vehicle based, at least in part, on a comparison between the temperature and a threshold temperature. For example, in some embodiments, the battery thermal event manager can initiate one or more first modifications to the vehicle in response to the temperature exceeding a first threshold temperature, but not exceeding a second threshold temperature that is greater than the first threshold temperature. In some embodiments, the battery thermal event manager can initiate one or more second modifications to the vehicle in response to the temperature exceeding the second threshold temperature, but not exceeding a third threshold temperature that is greater than the second threshold temperature. In some embodiments, the battery thermal event manager can initiate one or more third modifications to the vehicle in response to the temperature exceeding the third threshold temperature. In some embodiments, the battery thermal event manager can select the one or more modifications to the vehicle based, at least in part, on operating conditions of the vehicle. Additionally, in some instances, the one or more modifications can function to reduce the temperature, and in some instances, the one or more modifications can function to limit a hazardous condition. By initiating such modifications to the vehicle, embodiments of the present disclosure can automatically and proactively respond to vehicle battery temperature increases that can lead to a battery thermal event. Accordingly, embodiments of the present disclosure can reduce a likelihood of a battery having a battery thermal event; thus, embodiments of the present disclosure can facilitate improvements to vehicle safety. Additionally, certain embodiments of the present disclosure can decrease a likelihood of a larger vehicle fire resulting from a battery fire encountering hydrogen of a vehicle in a hydrogen source (e.g., a hydrogen fuel storage tank of a fuel-cell electric vehicle or a hydrogen combustion engine hybrid vehicle) or associated circuits of the vehicle.

Turning to the figures, FIG. 1 illustrates a system 100 that includes a vehicle 105, such as a battery electric vehicle, combustion engine hybrid vehicle, or a fuel cell electric vehicle. Vehicle 105 includes a set of vehicle subsystems

160 that can perform a plurality of tasks. For example, steering subsystem 130 can include a computing device configured to manage steering functions of vehicle 105 (e.g., enabling and disabling electrical power steering) and to output information such as wheel position and fault codes corresponding to steering the vehicle 105. A fault code can refer to data, such as a set of alphanumeric characters, that can indicate a malfunction of one or more components of vehicle 105. One or more of vehicle subsystems 160 and/or vehicle control module 110 can be configured to activate/generate and/or output a fault code. Braking subsystem 135 can include a computing device configured to manage braking functions of vehicle 105, such as regenerative braking and friction braking. In some embodiments, braking subsystem 135 can enable and disable regenerative braking of vehicle 105. In some embodiments, braking subsystem can output information regarding vehicle braking. Powertrain 140 can include components that propel the vehicle, such as engine, transmission, motor generators, and the like. Powertrain 140 can further include a computing device configured to output information regarding the operation of such components. Vision subsystem 145 can include one or more sensors (e.g., cameras, Light Detection and Ranging (LIDAR) devices, and/or Radio Detection and Ranging (RADAR) devices) that can detect and output data regarding the relative position of the vehicle 105 to other objects, such as other vehicles. Sensing devices 150 can include one or more temperature sensors, smoke detectors, virtual sensors, and the like, and can output information regarding a temperature or condition of power supply 155. Power supply 155 can include components such as a high voltage battery, auxiliary battery, a fuel-cell stack, a hydrogen source, combustion engine, etc. In some embodiments, power supply 155 can include one or more fans/blowers configured to vent hydrogen (e.g., leaked hydrogen from a fuel-cell stack). In some embodiments, power supply can include power supply 205, FIG. 2. Electrical subsystems 165 can include audio and visual indicators, such as hazard lights and speakers configured to emit audible warnings. User interface 170 can include a display configured to permit a user to input information and to receive communications regarding the vehicle 105. Thermal management subsystem 175 can include a computing device in communication with components (e.g., radiator, pumps, fans, and/or heat exchangers). In some embodiments, thermal management subsystem can be configured to cool a battery (e.g., a battery pack) of the one or more power supplies 155 and/or other components of vehicle 105 by a fluid, such as a liquid coolant.

Vehicle control module 110 (e.g., controller) can include a software application for managing the operation of vehicle subsystems 160. Vehicle control module 110 and vehicle subsystems 160 can include a computing device, such as computing device 500 discussed with respect to FIG. 5. In some embodiments, vehicle control module 110, battery thermal event manager 115, and/or one or more of vehicle subsystems 160 can exchange data through a network such as a controller area network (CAN). Vehicle control module 110 can include a battery thermal event manager 115. In some embodiments, battery thermal event manager 115 can be a software application installed on a computing device of vehicle control module 110. For example, battery thermal event manager 115 can be included as a plug-in software component of vehicle control module 110. Battery thermal event manager 115 can include program instructions implemented by a processor, such as a processor of vehicle control module 110, to perform one or more operations discussed with respect to FIG. 3 and/or FIG. 4. Battery thermal event manager 115 can include modules such as data manager 120 and modification manager 125. In some embodiments, data manager 120 can include program instructions to perform operations 305-310, FIG. 3. In some embodiments, modification manager 125 can include program instructions to perform operations 315-345, FIG. 3. In some embodiments, data manager 120 can include program instructions to perform operations 405-410, FIG. 4. In some embodiments, modification manager 125 can include program instructions to perform operations 415-420, FIG. 4.

Figure 2:
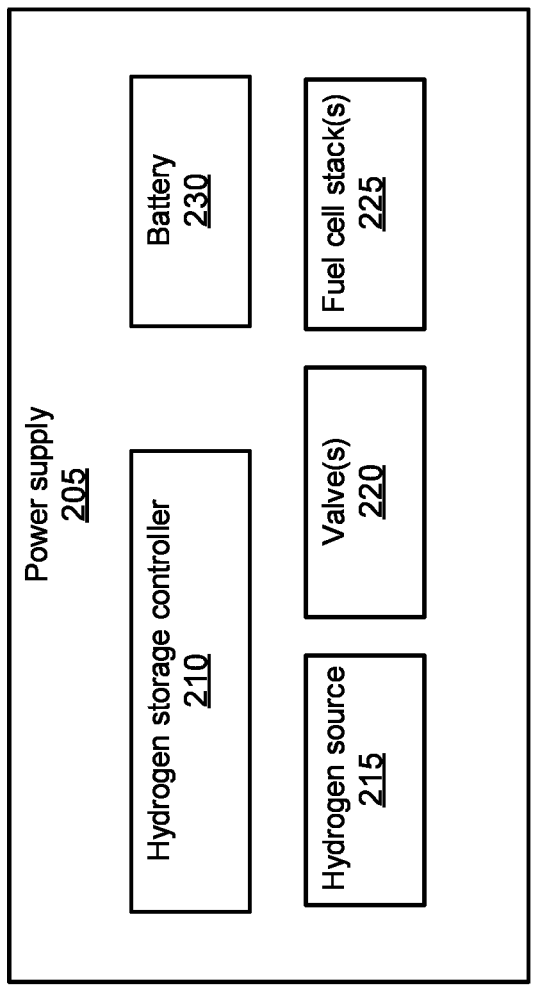
FIG. 2 depicts a block diagram of an example power supply of a fuel cell electric vehicle having a battery thermal event manager, in accordance with embodiments of the present disclosure.

FIG. 2 illustrates block diagram of an example power supply 205 of a fuel cell electric vehicle managed by a battery thermal event manager, in accordance with embodiments of the present disclosure. Power supply 205 includes a hydrogen storage controller 210 configured to actuate one or more valves 220 (e.g., commanded pressure relief devices) to release hydrogen fuel from hydrogen source 215 (e.g., hydrogen fuel storage tanks). The hydrogen storage controller 210 is configured to supply hydrogen fuel to one or more fuel-cell stacks 225 or hydrogen combustion engine. Valves 220 are configured to permit hydrogen fuel to pass to the one or more fuel-cell stacks 225 or hydrogen combustion engine or to be purged to the atmosphere. At least one battery 230 is configured to provide additional power to the vehicle.

Figure 3:
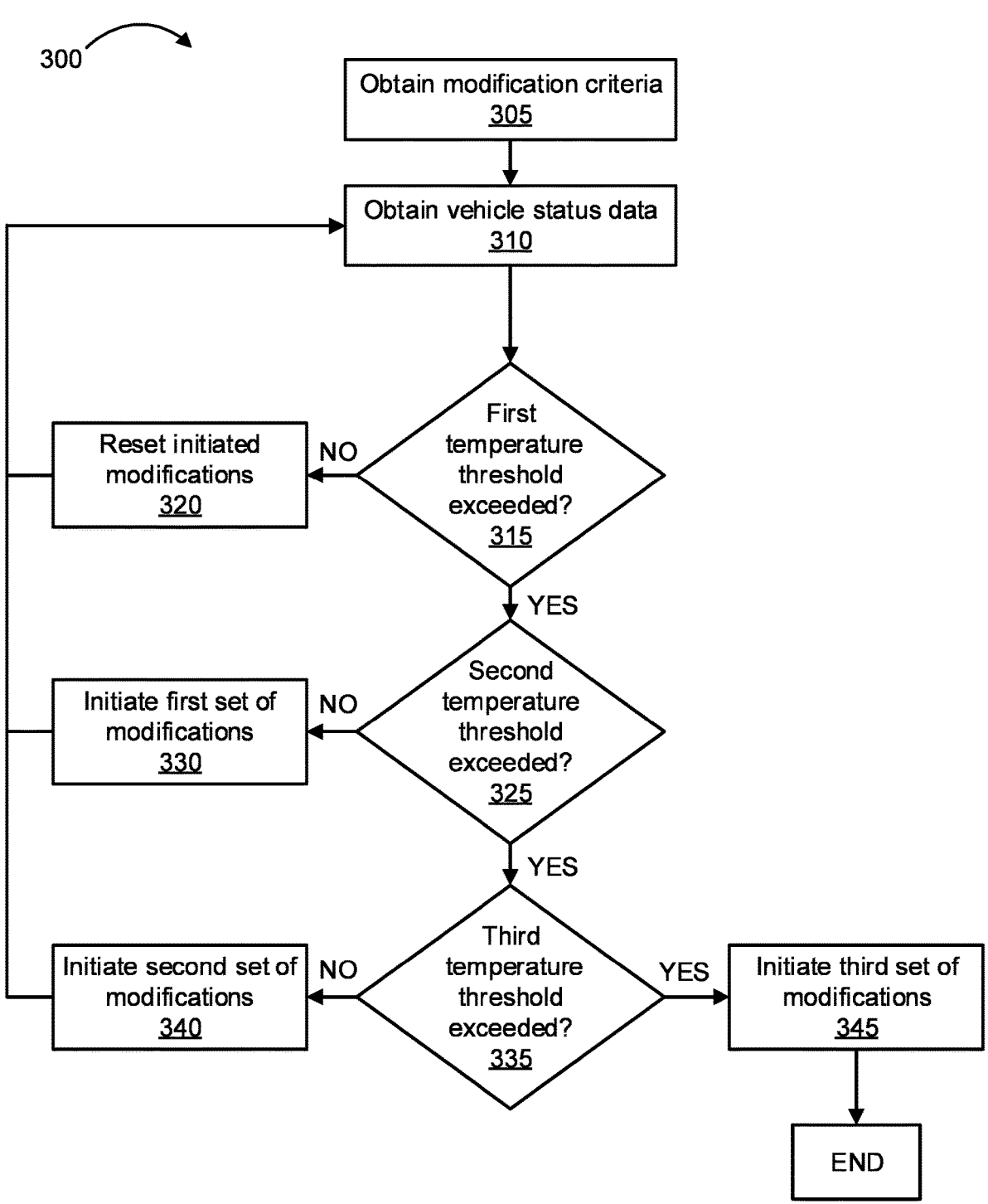
FIG. 3 depicts a flowchart of an example method for vehicle management for a battery thermal event, in accordance with embodiments of the present disclosure.

FIG. 3 illustrates a flowchart of an example method 300 for vehicle management for a battery thermal event, in accordance with embodiments of the present disclosure. Method 300 can be performed automatically (e.g., autonomously) by battery thermal event manager 115, FIG. 1.

Referring to FIG. 3, in operation 305, the battery thermal event manager obtains modification criteria. Modification criteria can include data corresponding to one or more modifications, or changes, that can be made to the vehicle. For example, in some embodiments, such a modification can include changing a powertrain from an initial state to a modified state in which its output torque is limited. In some embodiments, such a modification can include transitioning an electrical load from a higher voltage battery (e.g., a battery pack) of the vehicle to a lower voltage battery of the vehicle (e.g., an auxiliary battery). In some embodiments, modification criteria can include one or more instructions for the battery thermal event manager to initiate one or more respective modifications to the vehicle. In an example, modification criteria can include an instruction for the battery thermal event manager to command a user interface (e.g., a display) of the vehicle to present a message requesting that the vehicle operator exit the roadway and stop the vehicle.

In some embodiments, modification criteria can include sets of modifications, such as those shown in TABLE 1 below. In some embodiments, such sets of modifications can correspond to thresholds, such as battery temperature thresholds, as discussed below.

TABLE 1

| First set of modifications | |
| --- | --- |
| Increase battery cooling | Disable regenerative braking |
| Second set of modifications | |
| Activate fault codes/send notifications | Transition vehicle to different lane |
| Activate vehicle hazard lights | Transition electrical loads to auxiliary battery |
| Increase following distance to lead vehicle | Disable electric power steering |

TABLE 1-continued

| | |
|---|---|
| Limit engine output torque | Disconnect vehicle battery contacts |
| Limit vehicle speed | Purge hydrogen fuel from hydrogen source |
| | Third set of modifications |
| Activate vehicle safety measures | Deactivate vehicle |
| Exit roadway | Activate faults and notifications |
| Stop vehicle | |

TABLE 1 shows example first, second, and third sets of modifications that the battery thermal event manager can initiate to the vehicle. In some embodiments, the modification criteria can include first, second, and third battery temperature thresholds corresponding, respectively, to the first, second, and third sets of modifications. For example, the first set of modifications can correspond to a first battery temperature threshold of approximately 75° C. to approximately 85° C. In this example, for a case in which a battery temperature (e.g., a battery pack temperature) exceeds the first battery temperature threshold, the battery thermal event manager can initiate one or more modifications of the first set of modifications to the vehicle. Additionally in this example, for a case in which the battery temperature exceeds the second battery temperature threshold (e.g., approximately 120° C. to approximately 150° C.), the battery thermal event manager can initiate one or more modifications of the second set of modifications to the vehicle. Additionally in this example, for a case in which the battery temperature exceeds the third battery temperature threshold (e.g., approximately 300° C.), the battery thermal event manager can initiate one or more modifications of the third set of modifications to the vehicle. These temperatures can be higher or lower and will vary based on a given implementation. As such, the specific numbers should not be construed as strictly limiting the scope of this disclosure.

In some embodiments, initiating a modification can include the battery thermal event manager transmitting an instruction/command to the vehicle control module to perform the modification. In some embodiments, initiating a modification can include the battery thermal event manager transmitting an instruction/command to a vehicle subsystem to perform the modification. In some embodiments, initiating a modification can include the battery thermal event manager transmitting a notification (e.g., displaying a message on a user interface) such that a user (e.g., a vehicle operator) can perform the modification.

In some embodiments, the modification criteria can be selected by an entity, such as a programmer of the battery thermal event manager, and stored in memory of a computing device, such as a computing device of a vehicle control module of the vehicle. In some embodiments, operation 205 can include the battery thermal event manager obtaining (e.g., retrieving or receiving) the modification criteria from such memory.

In some embodiments, modification criteria can be tailored to a vehicle type (e.g., a battery electric, a hydrogen combustion engine hybrid, hydrogen combustion engine, or fuel cell electric). For example, a fuel-cell electric vehicle can include a plurality of fuel cells that generate electricity by a chemical reaction between hydrogen fuel and oxygen. In such a fuel-cell electric vehicle, the plurality of fuel cells can be included in an enclosure, forming a fuel-cell stack. Over time, traces of hydrogen can leak into the enclosure; thus, the fuel-cell electric vehicle can be configured to vent the leaked hydrogen from the enclosure to the atmosphere. For example, the fuel-cell electric vehicle can include a set of fans to direct the leaked hydrogen from the enclosure to the atmosphere. Recognizing that there is not necessarily a safe distance to propel vented hydrogen from the vehicle, this disclosure contemplates redirecting the hydrogen away from the batteries and/or ensuring sufficient air is being delivered to the exhaust system to dilute the concentration of hydrogen below the required threshold. The air flow from the air supply system can be measured and used to drive the purge value and this allows the operations of the fuel cell system venting system safely. The threshold mentioned above can be the Lower Flammability Limit (LFL) of hydrogen which is 4% by volume. So under normal operating conditions, this can be typically less than 50% of LFL (so 2% by volume).

Such a fuel-cell electric vehicle can include modification criteria such as an instruction for the battery thermal event manager to initiate stopping the venting of leaked hydrogen (e.g., stopping the operation of a set of fans) in response to an indication that a temperature of the fuel-cell stack or battery exceeds a threshold temperature or stopping the flow of hydrogen to the fuel cells or hydrogen combustion engine by actuating various valves 220 and increasing the venting if possible in response to an indication that the fuel-cell stack or battery is having an active thermal event. In this way, the battery thermal event manager can reduce the consequences of a battery thermal event, by reducing the likelihood of a fire driven by hydrogen. In some embodiments, the fuel-cell electric vehicle can include modification criteria such as an instruction for the battery thermal event manager to prevent the fuel-cell electric vehicle from entering an enclosed area, such as a tunnel, in response to an indication that a temperature of the fuel-cell stack or battery exceeds a threshold temperature or an indication that the fuel-cell stack or battery is having an active thermal event. When these thresholds apply to the battery, the modification criteria can apply equally to having a thermal event on a battery electric vehicle or a combustion hybrid vehicle in non-limiting examples. In these embodiments, the battery thermal event manager can initiate a notification, via a user interface, to an operator of the vehicle to avoid such an enclosed area. In this way, the battery thermal event manager can reduce the likelihood of a presence of flammable conditions in an enclosed area. In some embodiments, the fuel-cell electric vehicle can include modification criteria such as an instruction to stop the fuel-cell or battery from charging and/or an instruction to reallocate power away from other vehicle components to facilitate battery cooling.

In another example of modification criteria tailored to a hydrogen combustion engine hybrid electric vehicle or a fuel-cell electric vehicle, a hydrogen source, such as a hydrogen fuel storage tank, of the vehicle, can include a valve configured to purge stored hydrogen fuel from the hydrogen source. In embodiments of the present disclosure, such a valve can be a commanded pressure relief device, or a solenoid valve that is configured to purge stored hydrogen fuel from the hydrogen source in response to a command from a hydrogen storage controller or a battery thermal event manager. For example, the modification criteria can include an instruction for the battery thermal event manager to initiate purging of stored hydrogen fuel in response to an indication that a temperature of the fuel-cell stack or battery exceeds a threshold temperature, such as a temperature within a range of approximately 120° C. to approximately 150° C. In this way, the battery thermal event manager can proactively reduce the likelihood of a battery thermal event occurring or purge stored hydrogen from the vehicle to reduce the hazardous impact of an ongoing battery thermal event.

Referring back to FIG. 3, in operation 310, the battery thermal event manager obtains vehicle status data. Vehicle status data can include information about the operation and/or activity of the vehicle. For example, in some embodiments, vehicle status data can include information such as battery temperature data indicating a battery temperature of the battery, vehicle location and ambient condition information, information from sensors such as smoke detectors and gas sensors of the vehicle, information from vision systems of the vehicle, (e.g., cameras, LIDAR, RADAR), information from one or more of the vehicle's subsystems, information from the vehicle's powertrain, etc. In some embodiments, the battery thermal event manager can obtain battery temperature data from a virtual sensor, such as a model, or computer algorithm, configured to approximate a temperature of a power supply (e.g., a fuel-cell stack or a battery) based on information about the vehicle. In some embodiments, the battery thermal event manager can obtain battery temperature data from physical sensors of the vehicle.

In operation 315, the battery thermal event manager determines, by comparing the battery temperature to the first temperature threshold, whether the battery temperature exceeds the first temperature threshold. In response to determining that the first temperature threshold is exceeded, the battery thermal event manager proceeds to operation 325. Alternatively, in response to determining that the first temperature threshold is not exceeded, the battery thermal event manager proceeds to operation 320. In operation 320, the battery thermal event manager can reset (e.g., return to an initial state) any modifications previously initiated by the battery thermal event manager.

In operation 325, the battery thermal event manager determines, by comparing the battery temperature to the second temperature threshold, whether the battery temperature exceeds the second temperature threshold. In response to determining that the second temperature threshold is exceeded, the battery thermal event manager proceeds to operation 335. Alternatively, in response to determining that the first temperature threshold is not exceeded, the battery thermal event manager proceeds to operation 330, where it initiates one or more of the first set of modifications.

In operation 335, the battery thermal event manager determines, by comparing the battery temperature to the third temperature threshold, whether the battery temperature exceeds the third temperature threshold. In response to determining that the third temperature threshold is exceeded, the battery thermal event manager proceeds to operation 345, where it initiates one or more of the third set of modifications. Alternatively, in response to determining that the third temperature threshold is not exceeded, the battery thermal event manager proceeds to operation 340, where it initiates one or more of the second set of modifications.

To further illustrate embodiments of the present disclosure, the following is an example performance of method 300 by the battery thermal event manager. In operation 305, a battery thermal event manager of a vehicle can obtain modification criteria from a data storage device, such as a memory of a computing device of the vehicle's vehicle control module. The modification criteria can include instructions to initiate a first set of modifications to the vehicle in response to battery temperature data indicating that the temperature of the vehicle battery exceeds (i.e., is greater than) a first temperature threshold of 80° C. The modification criteria can further include instructions to initiate a second set of modifications to the vehicle in response to the battery temperature data indicating that the temperature of the vehicle battery exceeds a second temperature threshold of 150° C. The modification criteria can further include instructions to initiate a third set of modifications to the vehicle in response to the battery temperature data indicating that the temperature of the vehicle battery exceeds a third temperature threshold of 300° C.

In this example, the instructions to initiate the first set of modifications can include an instruction to initiate an increase in battery cooling capacity by the vehicle's thermal management subsystem. Such an increase can include the thermal management subsystem performing operations such as modifying a valve (e.g., opening or closing a valve) and/or modifying a pump (e.g., changing a pump speed) to increase a flow rate of a coolant fluid to the battery. In some embodiments, such an increase can include the thermal management subsystem performing such modifying of a valve or a pump so that a coolant fluid does not bypass a heat exchanger or a radiator used to cool the battery. Continuing with this example, the instructions to initiate the first set of modifications can further include an instruction to initiate disabling of regenerative braking by the vehicle's braking subsystem. Additionally, the instructions to initiate the first set of modifications can include an instruction to initiate the increase in battery cooling capacity before initiating the disabling of regenerative braking. In this way, the battery thermal event manager can prioritize regenerative braking such that it can remain active unless increasing battery cooling capacity by the vehicle's thermal management subsystem is insufficient to reduce the temperature of the vehicle battery below the first temperature threshold.

Continuing with this example, at a first time, in operation 310, the battery thermal event manager can obtain battery temperature data indicating that the temperature of the vehicle battery is approximately 90° C. In operation 315, the battery thermal event manager can determine, by comparing the temperature (i.e., 90° C.) to the first temperature threshold (i.e., 80° C.), that the temperature exceeds first temperature threshold. In operation 325, the battery thermal event manager can determine, by comparing the temperature (i.e., 90° C.) to the second temperature threshold (i.e., 150° C.), that the temperature does not exceed (i.e., is less than or equal to) the second temperature threshold. In response to the determination in operation 325, the battery thermal event manager can proceed to operation 330 and initiate an increase in battery cooling capacity by the vehicle's thermal management subsystem. In this example, the battery thermal event manager can select to initiate the increase in battery cooling based on the modification criteria prioritizing regenerative braking, as discussed above.

Continuing with this example, at a second time subsequent to the first time, in operation 310, the battery thermal event manager can obtain battery temperature data indicating that the temperature of the vehicle battery is approximately 100° C. Additionally, in operation 310, the battery thermal event manager can obtain data indicating that the increase in battery cooling is initiated. The battery thermal event manager can determine, in operation 315, that the temperature exceeds the first temperature threshold, and the battery thermal event manager can determine, in operation 325, that the temperature does not exceed the second temperature threshold. In response to the determination in operation 325, the battery thermal event manager can proceed to operation 330 and initiate disabling of regenerative braking by the vehicle's braking subsystem. In this example, the battery thermal event manager can select to initiate the disabling of regenerative braking based on both the vehicle status data obtained in operation 310 indicating that the increase in battery cooling is initiated and the modification criteria prioritizing regenerative braking, as discussed above.

Continuing with this example, at a third time subsequent to the second time, in operation 310, the battery thermal event manager can obtain battery temperature data indicating that the temperature of the vehicle battery is approximately 160° C. The battery thermal event manager can determine, in operation 315, that the temperature exceeds the first temperature threshold. In response, the battery thermal event manager can determine, in operation 325, that the temperature exceeds the second temperature threshold. In response to the determination in operation 325, the battery thermal event manager can determine, in operation 335, that the temperature does not exceed the third temperature threshold (i.e., 300° C.). In response to the determination in operation 335, the battery thermal event manager can proceed to operation 340 and initiate one or more modifications of the second set of modifications. In this example, the one or more modifications of the second set of modifications can include limiting the vehicle speed (e.g., limiting the powertrain of the vehicle, such that the vehicle cannot exceed approximately 45 km/h); activating hazard lights of the vehicle; instructing, by a user interface such as a display, a vehicle operator to transition the vehicle to a different lane or to stop the vehicle; and/or (e.g., as a last resort) disabling electric power steering. In this way, in response to the increased temperature, and therefore the increased hazard, at the third time, the battery thermal event manager can initiate a greater number of modifications to the vehicle. Additionally, the second set of modifications can disrupt the operation of the vehicle to a greater degree than the first set of modifications.

Continuing with this example, at a fourth time subsequent to the second time, in operation 310, the battery thermal event manager can obtain battery temperature data indicating that the temperature of the vehicle battery is approximately 65° C. Additionally, in operation 310, the battery thermal event manager can obtain data indicating the modifications previously initiated. The battery thermal event manager can determine, in operation 315, that the temperature does not exceed the first temperature threshold. In response, the battery thermal event manager can proceed to operation 320 and reset (e.g., return to an initial state from a modified state) the modifications previously initiated.

While battery thermal events have been discussed herein at length as potential triggers and/or predetermined events, this disclosure should in no way be limited as such. In fact, there are several potential triggers and/or predetermined events that may trigger the responses disclosed elsewhere herein. The following is a non-exclusive list of such potential triggers and/or predetermined events. Here are some examples fire/impending fire potential triggers and/or predetermined events. Battery thermal runaway potential triggers and/or predetermined events can include (i) impending where the battery temperature is increasing and cannot be brought back under control and (ii) occurring where the battery temperature is above the ignition temperature for hydrogen already. Battery fire potential triggers and/or predetermined events can include (i) impending where sensed parameters give reason to believe an unavoidable battery fire will occur, e.g., high temperature and (ii) occurring where battery fire is happening and has been detected. Fuel cell stack fire potential triggers and/or predetermined events can include (i) impending where sensed parameters give reason to believe an unavoidable fuel cell fire will occur, e.g., high temperature and (ii) occurring where fuel cell fire is happening and has been detected. H2 ice fire potential triggers and/or predetermined events can include (i) fuel-related fire where engine fire is happening and has been detected, (ii) lubricant-related fire where engine fire is happening and has been detected, (iii) aftertreatment-related fire/exotherm where accumulated material in the exhaust is reacting exothermically and producing excess heat—fire may or may not have occurred.

Here are some example electrical potential triggers and/or predetermined events. HV short detected potential triggers and/or predetermined events can include (i) fuel cell stack where significant electrical short has been detected which could lead to an ignition source, (ii) vehicle HV bus where significant electrical short has been detected which could lead to an ignition source, and (iii) battery pack internal where significant electrical short has been detected which could lead to an ignition source. LV short detected potential triggers and/or predetermined events can include significant electrical short has been detected which could lead to an ignition source.

Here are some example crash potential triggers and/or predetermined events. Severe crash detected potential triggers and/or predetermined events can include (i) inertia switch where switch has detected a significant crash and (ii) accelerometer measurement where measured acceleration has exceeded a set threshold. Post-crash fire detected potential triggers and/or predetermined events can include fire detection system has recognised a fire occurring after a crash.

Here are some example additional or alternative potential triggers and/or predetermined events. Unfixable hydrogen leak potential triggers and/or predetermined events can include hydrogen leak detected that cannot be fixed where significant hydrogen leak detected near e.g. HV equipment, safest option is to enact a controlled fuel vent. Other potential triggers and/or predetermined events can include emergency vent requested by vehicle operator, by service technician, and/or by emergency first responder. These are just some of the many examples contemplated herein and that would be apparent to those skilled in the art and are therefore included in the scope of this disclosure.

Figure 4:
FIG. 4 depicts a flowchart of an example method for fuel management for a predetermined event, in accordance with embodiments of the present disclosure.
Figure 4:
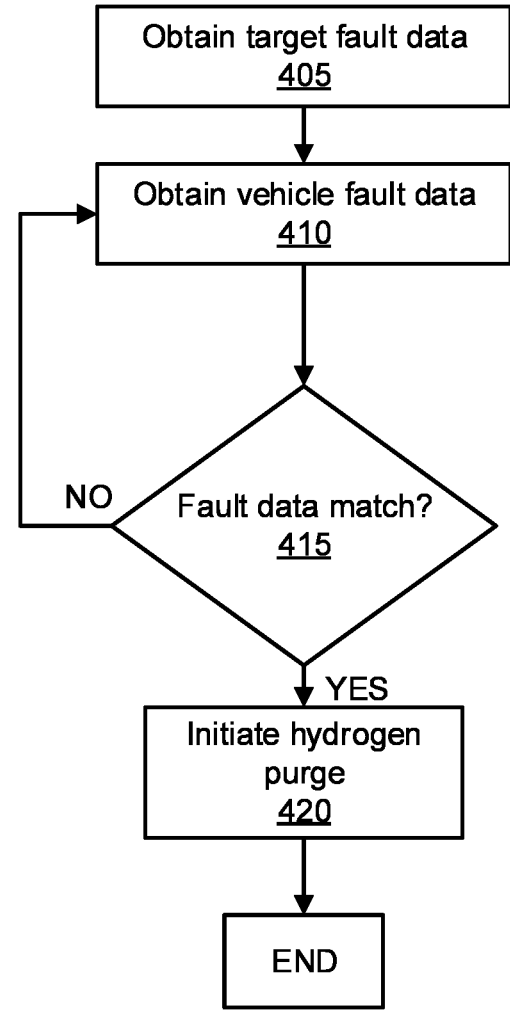

FIG. 4 is a flowchart of an example process 400. In some implementations, one or more process blocks of FIG. 4 may be performed by a device, such as vehicle control module 110 (e.g., controller) discussed elsewhere herein.

As shown in FIG. 4, process 400 may include obtaining target fault data indicating a preselected fault for a vehicle having a hydrogen source (block 405). For example, device may obtain target fault data indicating a preselected fault for a vehicle having a hydrogen source, as described above. As also shown in FIG. 4, process 400 may include obtaining vehicle fault data indicating a fault of the vehicle (block 410). For example, device may obtain vehicle fault data indicating a fault of the vehicle, as described above. As further shown in FIG. 4, process 400 may include identifying a match between the fault and the preselected fault (block 415). For example, device may identify a match between the fault and the preselected fault, as described above. As also shown in FIG. 4, process 400 may include purging, in response to the identifying the match, hydrogen from one or more components (e.g., the hydrogen source, the fuel cell stack enclosure, and/or the fuel lines in any combination) of the vehicle so as to reduce consequences of a battery thermal event by reducing the likelihood of a hydrogen-fueled fire (block 420). For example, device may purge, in response to the identifying the match, hydrogen from the hydrogen source so as to reduce consequences of a battery thermal event by reducing the likelihood of a hydrogen-fueled fire, as described above.

Process 400 may include additional implementations, such as any single implementation or any combination of implementations described below and/or in connection with one or more other processes described elsewhere herein. In a first implementation, both the fault and the preselected fault indicate an electrical short in the vehicle.

In a second implementation, alone or in combination with the first implementation, both the fault and the preselected fault indicate a fire on a component of the vehicle.

In a third implementation, alone or in combination with the first and second implementation, the component may include a battery of the vehicle or a fuel cell of the vehicle.

In a fourth implementation, alone or in combination with one or more of the first through third implementations, both the fault and the preselected fault indicate a collision of the vehicle.

In a fifth implementation, alone or in combination with one or more of the first through fourth implementations, both the fault and the preselected fault indicate a hydrogen leak in the vehicle.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
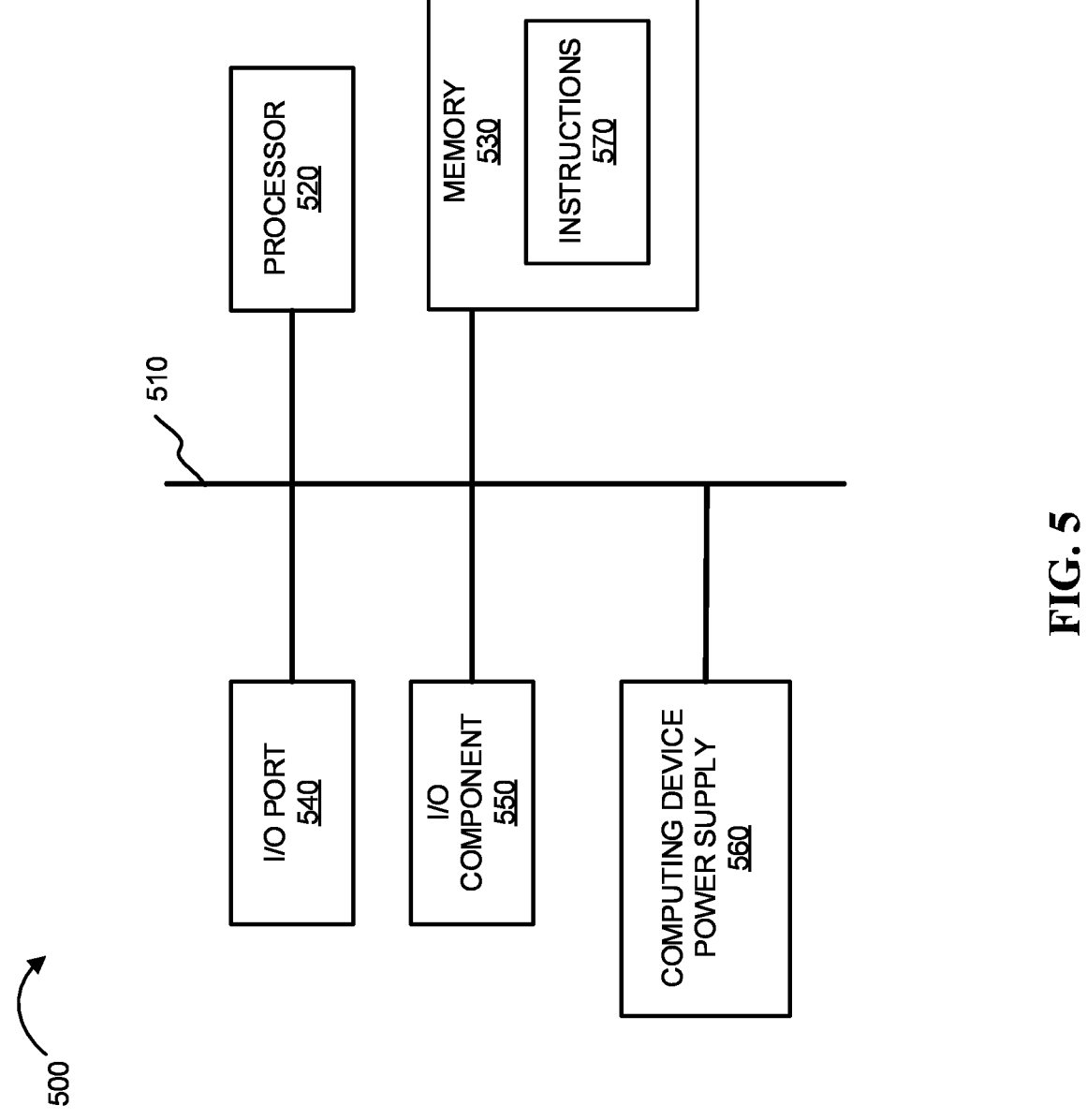
FIG. 5 depicts an example computing device that can be used in accordance with embodiments of the present disclosure.

FIG. 5 is a block diagram depicting an illustrative computing device 500, in accordance with embodiments of the disclosure. The computing device 500 may include any type of computing device suitable for implementing aspects of embodiments of the disclosed subject matter. Each of the various components shown and described in the Figures can contain their own dedicated set of computing device components, such as those shown in FIG. 5 and described below. For example, the vehicle control module 110, FIG. 1 and the thermal management subsystem 130, FIG. 1 can each include a set of components shown in FIG. 5 and described below.

In embodiments, the computing device 500 includes a bus 510 that, directly and/or indirectly, couples one or more of the following devices: a processor 520, a memory 530, an input/output (I/O) port 540, an I/O component 550, and a computing device power supply 560. Any number of additional components, different components, and/or combinations of components may also be included in the computing device 500.

The bus 510 represents what may be one or more busses (such as, for example, an address bus, data bus, or combination thereof). Similarly, in embodiments, the computing device 500 may include a number of processors 520, a number of memory components 530, a number of I/O ports 540, a number of I/O components 550, and/or a number of power supplies 560. Additionally, any number of these components, or combinations thereof, may be distributed and/or duplicated across a number of computing devices.

In embodiments, the memory 530 includes computer-readable media in the form of volatile and/or non-volatile memory and may be removable, nonremovable, or a combination thereof. Media examples include random access memory (RAM); read only memory (ROM); electronically erasable programmable read only memory (EEPROM); flash memory; optical or holographic media; magnetic cassettes, magnetic tape, magnetic disk storage or other magnetic storage devices; data transmissions; and/or any other medium that can be used to store information and can be accessed by a computing device. In embodiments, the memory 530 stores computer-executable instructions 570 for causing the processor 520 to implement aspects of embodiments of components discussed herein and/or to perform aspects of embodiments of methods and procedures discussed herein. The memory 530 can comprise a non-transitory computer readable medium storing the computer-executable instructions 570.

The computer-executable instructions 570 may include, for example, computer code, machine-useable instructions, and the like such as, for example, program components capable of being executed by one or more processors 520 (e.g., microprocessors) associated with the computing device 500. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 570 may be configured to be executed by the processor 520 and, upon execution, to cause the processor 520 to perform certain processes. In certain embodiments, the processor 520, memory 530, and instructions 570 are part of a controller such as an application specific integrated circuit (ASIC), field-programmable gate array (FPGA), and/or the like. Such devices can be used to carry out the functions and steps described herein.

The I/O component 550 may include a presentation component configured to present information to a user such as, for example, a display device, a speaker, and/or the like, and/or an input component such as, for example, a microphone, a wireless device, a keyboard, a voice input device, a touch input device, a touch-screen device, an interactive display device, a mouse, and/or the like.

The devices and systems described herein can be communicatively coupled via a network, which may include a controller area network (CAN), local area network (LAN), a wide area network (WAN), a cellular data network, via the internet using an internet service provider, and the like.

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions.

Various modifications and additions can be made to the exemplary embodiments discussed without departing from the scope of the disclosed subject matter. For example, while the embodiments described above refer to particular features, the scope of this disclosure also includes embodiments having different combinations of features and embodiments that do not include all of the described features. Accordingly, the scope of the disclosed subject matter is intended to embrace all such alternatives, modifications, and variations as fall within the scope of the claims, together with all equivalents thereof

We claim:

1. A method comprising:

obtaining target fault data indicating a preselected fault for a vehicle having a hydrogen source;

obtaining vehicle fault data indicating a fault of the vehicle;

identifying a match between the fault and the preselected fault; and purging, in response to the identifying the match, hydrogen from one or more components of the vehicle so as to reduce consequences of a battery thermal event by reducing the likelihood of a fire, wherein the purging is controlled based on modification criteria comprising a set of threshold temperatures associated with a battery of the vehicle and a set of mitigation actions, the set of mitigation actions being selectable based on a severity tier associated with a detected battery temperature threshold, and wherein the purging is performed in accordance with at least one of:

(i) removing hydrogen from one or more non-fuel-cell components of the vehicle, and (ii) executing the modification criteria to reduce consequences of a battery thermal event.

2. The method of claim 1, wherein both the fault and the preselected fault indicate at least one of:

an electrical short in the vehicle;

a fire on a component of the vehicle;

a collision of the vehicle;

a hydrogen leak in the vehicle; and a thermal overrun condition associated with the battery.

3. The method of claim 2, wherein when both the fault and the preselect fault indicate a fire on a component of the vehicle, the component comprises a battery of the vehicle or a fuel cell of the vehicle.

4. The method of claim 1, wherein the non-fuel-cell components include at least one of a hydrogen storage vessel, a containment line, or a hydrogen conduit positioned between the hydrogen storage vessel and a fuel cell stack.

5. The method of claim 1, wherein executing the purge comprises issuing a control signal to both a hydrogen release valve and a battery cooling system.

6. The method of claim 1, wherein the method is executed by a controller integrable into a vehicle.

7. The method of claim 1, further comprising regenerative brakes supported by the vehicle and wherein the set of threshold temperatures comprises a first temperature, a second temperature greater than the first temperature, and a third temperature greater than the second temperature, and wherein the one or more modifications comprises (i) increasing cooling of the battery, and (ii) disabling a regenerative braking function of the vehicle.

8. A vehicle comprising:

a powertrain having a prime mover for propelling the vehicle, a hydrogen source for fueling the prime mover, a battery for supplying electricity to the vehicle, and a thermal management subsystem configured to:

obtain vehicle status data for the vehicle, the vehicle status data including battery temperature data indicating a battery temperature of the battery;

obtain modification criteria for the vehicle, the modification criteria comprising data corresponding to:

a set of threshold temperatures associated with the battery, and a set of modifications associated with the vehicle;

receiving an indication that the battery temperature exceeds a threshold temperature of the set of threshold temperatures; and initiate, in response to receiving an indication that the battery temperature exceeds the threshold temperature, one or more modifications of the set of modifications to the vehicle, the one or more modifications including purging stored hydrogen fuel from the hydrogen source of the vehicle so as to proactively vent hydrogen from the hydrogen fuel source in view of a predetermined event.

9. The vehicle of claim 8, wherein the set of threshold temperatures comprises:

a first temperature;

a second temperature greater than the first temperature; and a third temperature greater than the second temperature.

10. The vehicle of claim 9, wherein the vehicle includes regenerative brakes, and wherein the threshold temperature is the first temperature, and wherein the one or more modifications comprises:

increasing cooling of the battery, and disabling a regenerative braking function of the vehicle.

11. The vehicle of claim 10, wherein the first temperature corresponds to a temperature prior to which contacts of the battery would otherwise be disconnected.

12. The vehicle of claim 9, wherein the threshold temperature is the second temperature, and wherein the one or more modifications comprises limiting a speed of the vehicle.

13. The vehicle of claim 12, wherein the second temperature corresponds to a temperature at which limiting the speed of the vehicle will assist in cooling the battery.

14. The vehicle of claim 9, wherein the threshold temperature is the third temperature, and wherein the one or more modifications comprises purging stored hydrogen fuel from the hydrogen source of the vehicle until the vehicle until the hydrogen source is depleted.

15. The vehicle of claim 14, wherein the third temperature corresponds to a temperature prior to which the vehicle would otherwise be deactivated.

16. The vehicle of claim 8, wherein the thermal management subsystem initiates the one or more modifications by selecting, based on the vehicle status data and the modification criteria, the one or more modifications from the set of modifications or wherein the thermal management subsystem includes a hydrogen storage controller configured to actuate one or more valves to release hydrogen from the hydrogen source, and one or more valves includes a commanded pressure relief device.

17. A controller of a vehicle comprising:

a processor; and a memory in communication with the processor, the memory containing program instructions that, when executed by the processor, are configured to cause the processor to perform a method, the method comprising:

obtaining vehicle status data for a vehicle comprising a battery, the vehicle status data including battery temperature data indicating a battery temperature of the battery;

obtaining modification criteria for the vehicle, the modification criteria comprising data corresponding to:

a set of threshold temperatures associated with the battery, and a set of modifications associated with the vehicle;

determining that the battery temperature exceeds a threshold temperature of the set of threshold temperatures; and initiating, in response to the determining that the battery temperature exceeds the threshold temperature, one or more modifications of the set of modifications to the vehicle, the one or more modifications including purging stored hydrogen fuel from a hydrogen source of the vehicle so as to proactively vent hydrogen from the hydrogen fuel source in view of a predetermined event.

18. The controller of claim 17, wherein the set of threshold temperatures comprises:

a first temperature;

a second temperature greater than the first temperature; and a third temperature greater than the second temperature.

19. The controller of claim 18, wherein the threshold temperature is the first temperature, and wherein the one or more modifications comprises:

increasing cooling of the battery, and disabling a regenerative braking function of the vehicle; and wherein the first temperature corresponds to a temperature prior to which contacts of the battery would otherwise be disconnected.

20. The controller of claim 18, wherein the threshold temperature is the second temperature, and wherein the one or more modifications comprises limiting a speed of the vehicle; and wherein the second temperature corresponds to a temperature at which limiting the speed of the vehicle will assist in cooling the battery.

21. The controller of claim 18, wherein the threshold temperature is the third temperature, and wherein the one or more modifications comprises deactivating the vehicle; and wherein the third temperature corresponds to a temperature prior to which the vehicle would otherwise be deactivated.

\* \* \* \* \*